(12) United States Patent
Wu

(10) Patent No.: US 7,173,404 B2
(45) Date of Patent: Feb. 6, 2007

(54) AUTO-SWITCHING CONVERTER WITH PWM AND PFM SELECTION

(75) Inventor: Chung Cheng Wu, Tao Yuan (TW)

(73) Assignee: Niko Semiconductor Co., Ltd., Taipei (TW)

(*) Notice: Subject to any disclaimer, the term of this patent is extended or adjusted under 35 U.S.C. 154(b) by 255 days.

(21) Appl. No.: 10/915,398

(22) Filed: Aug. 11, 2004

(65) Prior Publication Data

US 2006/0033483 A1    Feb. 16, 2006

(51) Int. Cl.
*G05F 1/56* (2006.01)

(52) U.S. Cl. ............... 323/283; 323/285; 323/901; 327/175; 363/41; 363/49; 363/95

(58) Field of Classification Search ............ 323/282, 323/283, 901, 285; 327/175; 363/41, 49, 363/95, 97, 98
See application file for complete search history.

(56) References Cited

U.S. PATENT DOCUMENTS

| | | | | |
|---|---|---|---|---|
| 5,568,044 A | * | 10/1996 | Bittner | 323/272 |
| 5,905,370 A | * | 5/1999 | Bryson | 323/283 |
| RE37,609 E | * | 3/2002 | Bittner | 323/272 |
| 6,489,756 B2 | * | 12/2002 | Kanouda et al. | 323/284 |
| 6,611,132 B2 | * | 8/2003 | Nakagawa et al. | 323/284 |
| 7,061,213 B2 | * | 6/2006 | Yoshida | 323/224 |

* cited by examiner

*Primary Examiner*—Jeffrey Sterrett
(74) *Attorney, Agent, or Firm*—Troxell Law Office, PLLC

(57) ABSTRACT

An auto-switching converter with PWM and PFM selection supplies a boosted DC power to a load through a power switch unit. A starter outputs a starting-enabling signal. An auto PWM/PFM controller is connected to the starter for outputting a selection signal. A controller and a PFM controller are connected to the auto PWM/PFM controller, the power switch unit and the load for transmitting a PWM control signal and a PFM control signal to the power switch unit, respectively, for controlling the switching action of the power switch unit.

10 Claims, 5 Drawing Sheets

US 7,173,404 B2

AUTO-SWITCHING CONVERTER WITH PWM AND PFM SELECTION

BACKGROUND OF THE INVENTION

1. Field of the Invention

The present invention relates to an auto-switching converter with PWM and PFM selection, and more specifically to a converter used to auto-switch either a PWM (pulse width modulation) or a PFM (pulse frequency modulation) module to perform DC to DC or AC to DC in response to variation of the load.

2. Description of the Related Art

Electronic products are used universally, and power supply for electronic products is very important. At present, power for electronic products is universally supplied with a switching technique, and PWM and PFM are two kinds of switching schemes.

The PWM switching technique is used to control the switching action of power switches to supply power to an electronic product when the electronic product is working under a full or heavy load, and at this time, the electronic product produces a transmitting loss and a switching loss. Moreover, when the electronic product is working under a low load with the PWM switching scheme, the transmitting loss is reduced but the switching loss is not, because the frequency of the switching is constant. Therefore, the efficiency of the electronic product is reduced when working under a low load with the PWM switching scheme.

As mentioned above, when the electronic product is working under a low load, the PFM switching technique is usually used to control the switching action of power switches. The frequency of the switching is reduced in response to the load of the electronic product, and the switching loss is reduced for a low load. When the electronic product works under a low load, the efficiency of the electronic product with the PFM switching scheme is higher than that with PWM switching technique.

SUMMARY OF THE INVENTION

The primary object of the present invention is to enhance the efficiency of the electronic product by auto-switching the two modes of PWM switching schemes and the PFM switching schemes following the variation of the load.

The present invention uses an auto PWM/PFM controller to connect to a starter, a PWM controller and a PFM controller. The starter transmits a starting-enabling signal to the auto PWM/PFM controller for enabling the auto PWM/PFM controller. After enabling the auto PWM/PFM controller, the PWM controller and the PFM controller transmit a feedback signal to the auto PWM/PFM controller, respectively, for driving the auto PWM/PFM controller to output a selection signal. The auto PWM/PFM controller transmits the selection signal to enable either the PWM controller or the PFM controller. Moreover, the enabled controller transmits a control signal to a power switch unit, which is connected to the PWM controller and the PFM controller. The control signal drives the power switch unit switching for supplying a DC power to a load, which is connected to the power switch unit.

As mentioned above, the auto PWM/PFM controller of the present invention uses a PWM comparator and a PFM comparator to connect to a reference voltage generator, the starter, the PWM controller and the PFM controller for receiving a reference voltage signal, the starting-enabling signal and an error signal, respectively, so as to output a PWM comparison signal and a PFM comparison signal. A first flip-flop is connected to the PWM comparator and the PFM comparator for receiving the PWM comparison signal and a PFM comparison signal, and outputting a reset signal. An AND circuit outputs an AND signal, and a second flip-flop is connected to the first flip-flop and the AND circuit for receiving the reset signal and the AND signal, and outputting the selection signal.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
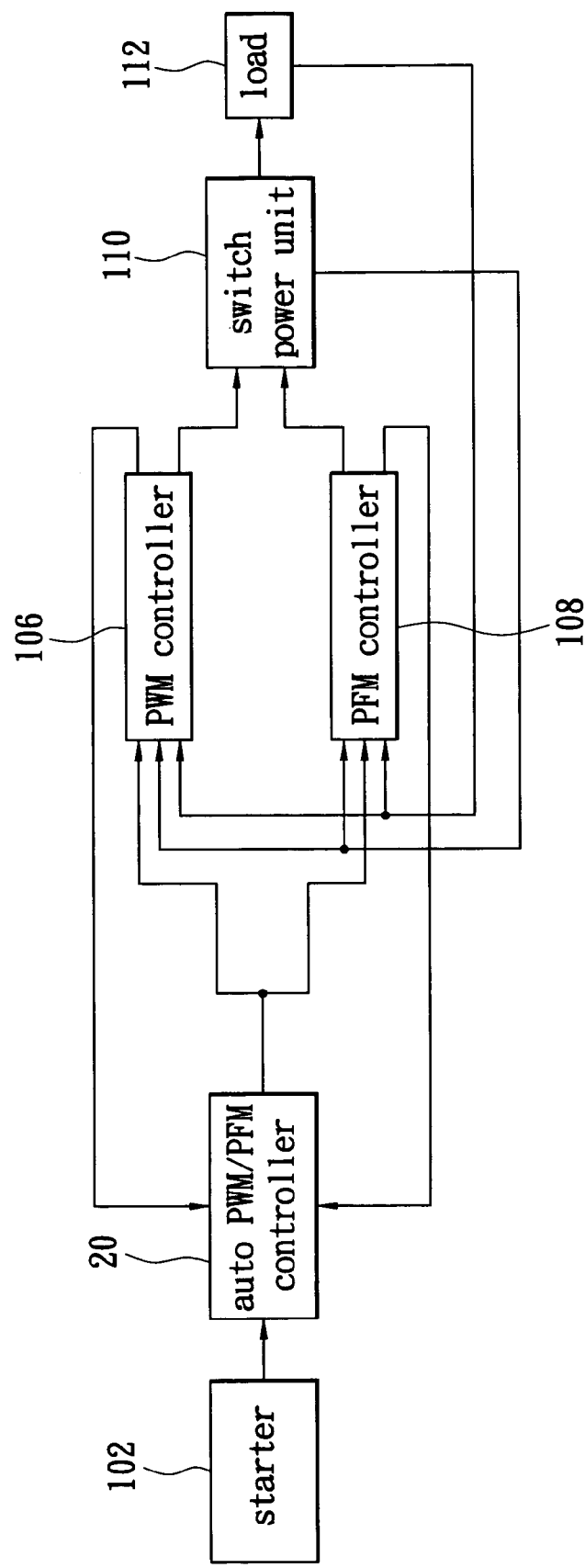
FIG. 1 is a schematic circuit diagram of the present invention.

FIG. 1 is a schematic circuit diagram of the present invention. The present invention uses an auto PWM/PFM controller 20 to connect to a starter 102, a PWM controller 106 and a PFM controller 108. The starter 102 transmits a starting-enabling signal to the auto PWM/PFM controller 20 for enabling the auto PWM/PFM controller 20. After enabling the auto PWM/PFM controller 20, the PWM controller 106 and the PFM controller 108 transmits a feedback signal to the auto PWM/PFM controller 20, respectively, for driving the auto PWM/PFM controller 20 to output a selection signal. The auto PWM/PFM controller 20 transmits the selection signal to enable either the PWM controller 106 or the PFM controller 108. Moreover, the enabled controller transmits a control signal to a power switch unit 110, which is connected to the PWM controller 106 and the PFM controller 108. The control signal drives the power switch unit 110 to switch to supplying a DC power to a load 112, which is connected to the power switch unit 110.

Figure 2:
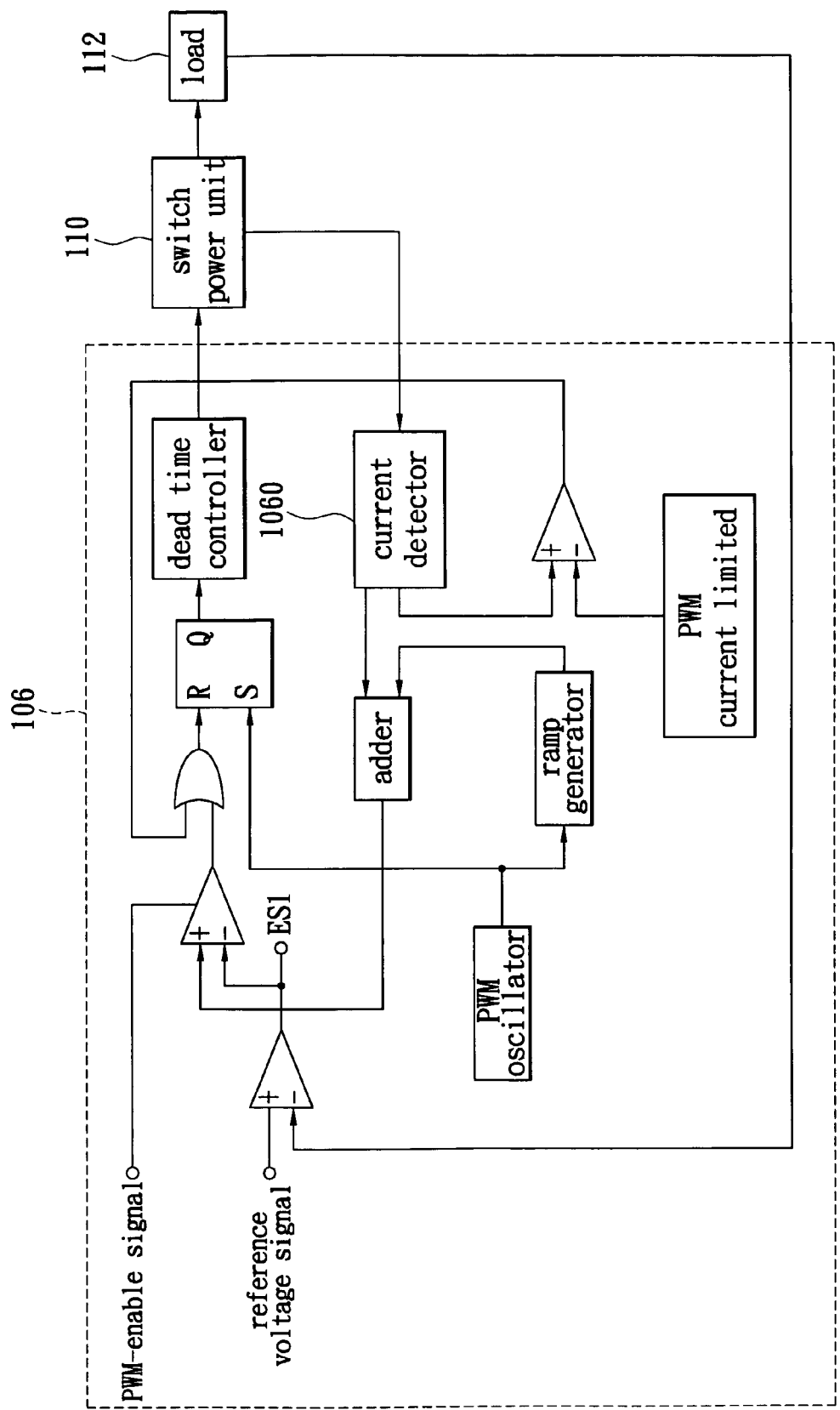
FIG. 2 is a schematic circuit diagram of the PWM controller of the present invention.

With reference to FIG. 1, FIG. 2 shows a schematic circuit diagram of the PWM controller of the present invention. The PWM controller 106 connects to the power switch unit 110 and the load 112 for receiving a feedback voltage signal from the load 112. The PWM controller 106 compares the feedback voltage signal with a reference voltage VREF for outputting an error signal ES1 to the auto PWM/PFM controller 20. Moreover, the PWM controller 106 detects a load current signal of the power switch unit 110 by a current detector 1060.

The auto PWM/PFM controller 20 transmits the selection signal to enable the PWM controller 106 to process the feedback voltage signal and the load current signal. After processing, the PWM controller 106 outputs a PWM control signal to the power switch unit 110 for controlling the switching action of the power switch unit 110. This time the selection signal is a PWM-enable signal PWMEN.

Figure 3:
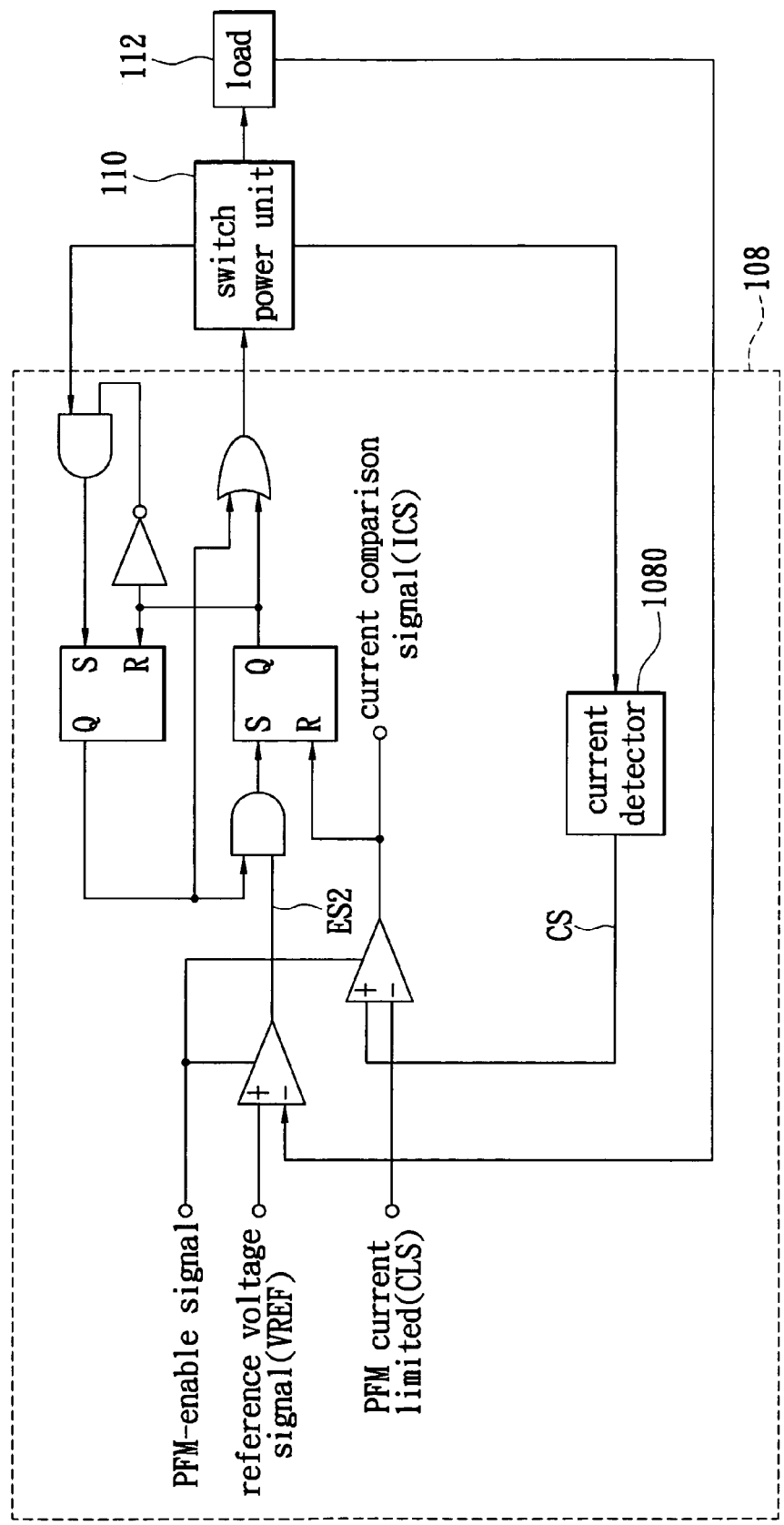
FIG. 3 is a schematic circuit diagram of the PFM controller of the present invention.

With reference to FIG. 1, FIG. 3 shows a schematic circuit diagram of the PFM controller of the present invention. The PFM controller 108 connects to the power switch unit 110 and the load 112 for receiving a feedback voltage signal from the load 112. The PFM controller 108 compares the feedback voltage signal with a reference voltage VREF for outputting an error signal ES2. Moreover, the PFM controller 108 detects a load current signal CS of the power switch unit 110 by a current detector 1080. The PFM controller 108 compares the load current signal CS with a reference current CLS for outputting a current comparison signal to the auto PWM/PFM controller 20

The auto PWM/PFM controller 20 transmits the selection signal to enable the PFM controller 108 to process the error signal ES2 and the load current signal CS. After processing, the PFM controller 108 outputs a PFM control signal to the power switch unit 110 for controlling the switching action of the power switch unit 110. This time the selection signal is a PFM-enable signal PFMEN.

Figure 4:
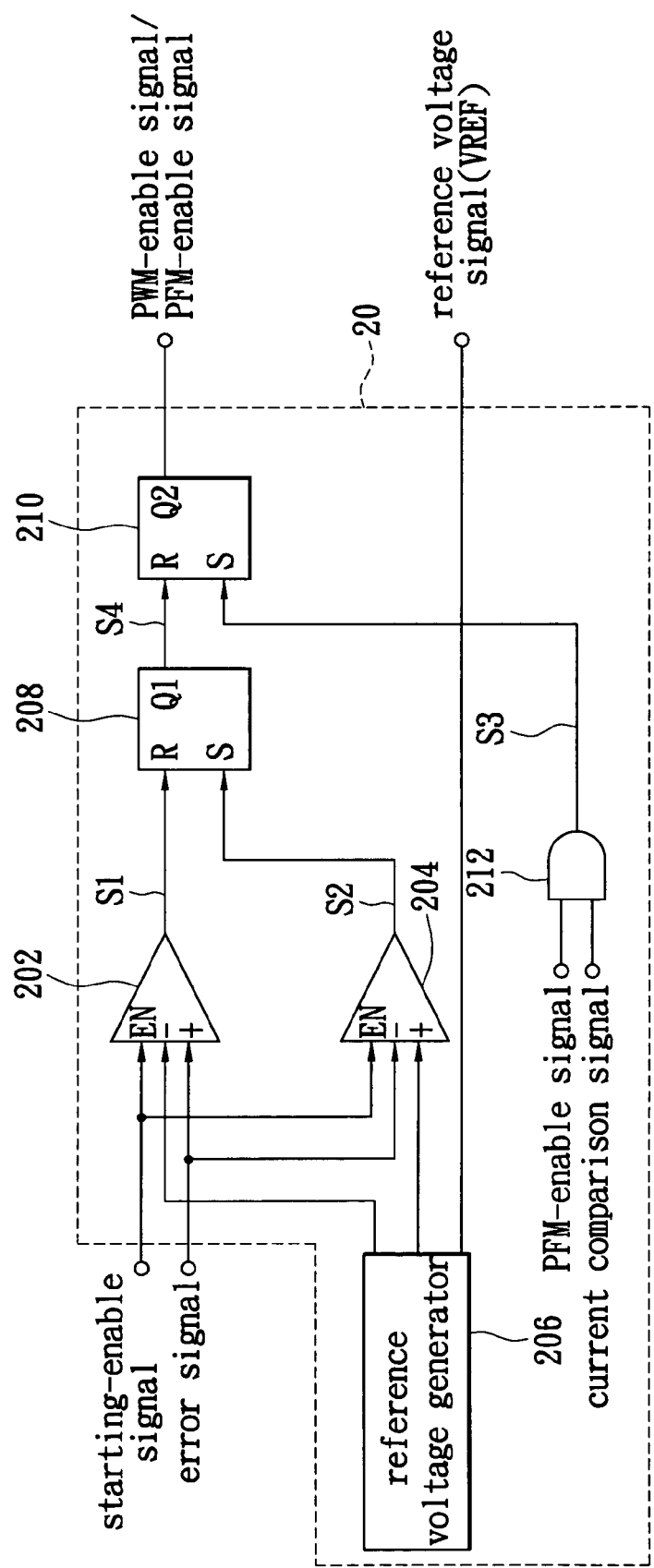
FIG. 4 is a schematic circuit diagram of the auto PWM/PFM controller of the present invention.

With reference to FIG. 1, FIG. 4 shows a schematic circuit diagram of the auto PWM/PFM controller of the present invention. The auto PWM/PFM controller 20 of the present invention uses the PWM comparator 202 and the PFM comparator 204 to connect to the starter 102, the PWM controller 106 and a reference voltage generator 206 for receiving the starting-enable signal, the error signal ES1 and the reference voltage signal. The PWM comparator 202 and the PFM comparator 204 compare the reference voltage signal with the error signal ES1 for outputting a PWM comparison signal and a PFM comparison signal, respectively. In abovementioned description, the reference voltage signal VPWM output by the reference voltage generator 206 to the PWM controller 106 is higher than the reference voltage signal VPFM output to the PFM controller 108.

As shown in FIG. 4, a first flip-flop 208 in the auto PWM/PFM controller 20 is connected to the PWM comparator 202 and the PFM comparator 204 by two inputs, respectively, is connected to a second flip-flop 210 by one output for receiving the PWM comparison signal SI and the PFM comparison signal S2, and outputs a reset signal to the second flip-flop 210. The second flip-flop 210 is connected to the first flip-flop 208 and an AND circuit 212 by two inputs, respectively, for receiving the reset signal and an AND signal, and outputs a selection signal, which is distributed to a PWM-enable signal PWMEN or a PFM-enable signal PFMEN. Moreover, the AND circuit 212 receives the PFM-enable signal PFMEN and the current comparison signal ICS for performing an AND operation. After performing the AND operation, the AND circuit 212 outputs the AND signal. As mentioned above, each the first flip-flop 208 and the second flip-flop 210 is an R-S flip-flop.

Figure 5:
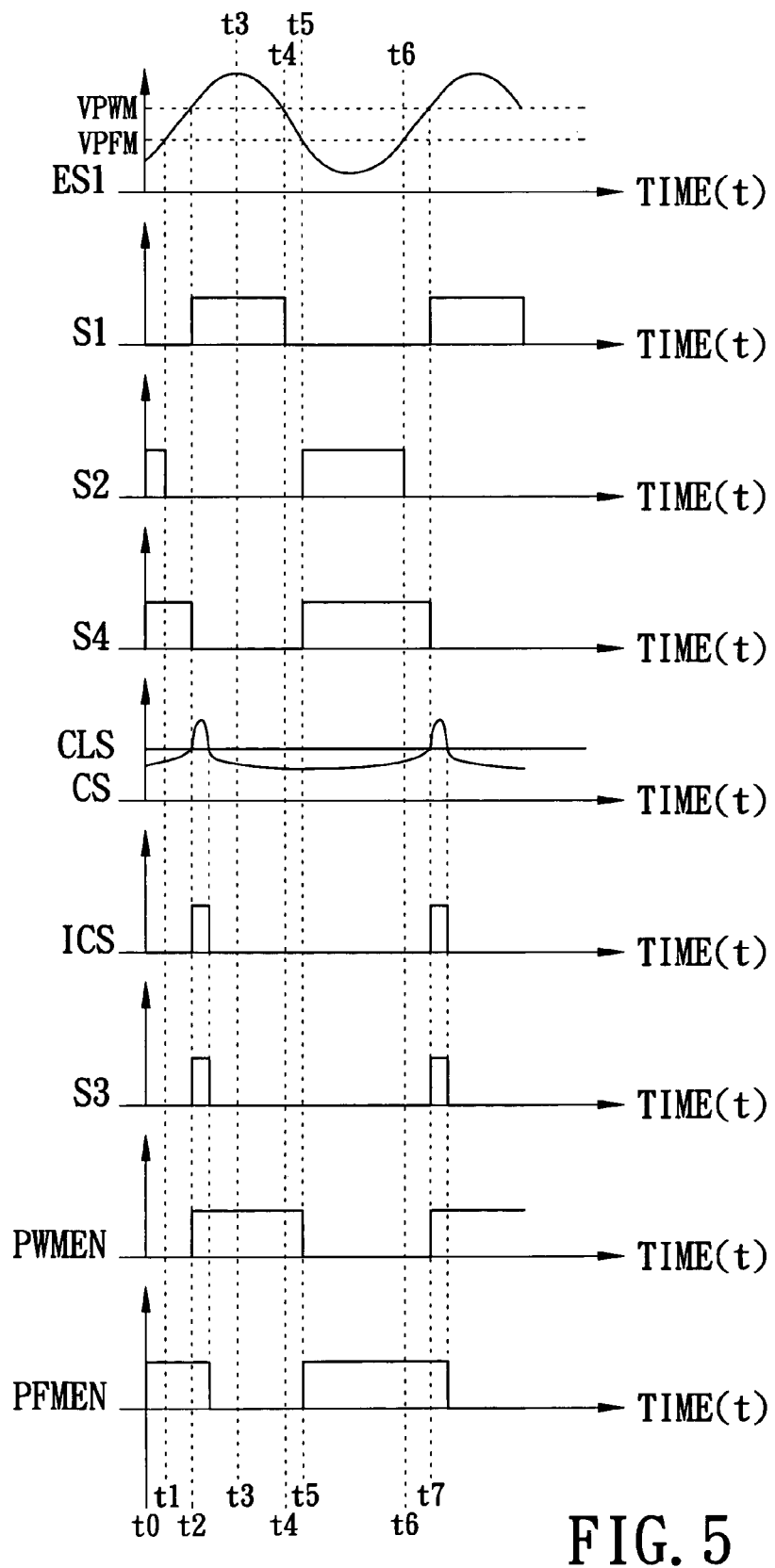
FIG. 5 is a schematic wave diagram of control signals of the present invention.

With reference also to FIG. 3 and FIG. 4, FIG. 5 shows a schematic wave diagram of control signals of the present invention. As shown in FIG. 5, the error signal ES1 is lower than the reference voltage signal VPFM at time t0–t1. Therefore, the PWM comparison signal S1 is low and the PFM comparison signal S2 is high. The PFM comparison signal S2 is transmitted to the set terminal of the first flip-flop 208, so the reset signal S4 is high. Then the reset signal S4 is transmitted to a reset terminal of the second flip-flop 210 for driving the second flip-flop 210 to output a low selection signal, which is the PFM-enable signal PFMEN. At this time, because the load current signal CS is lower than the reference current CLS, the current comparison signal ICS is low, and the AND circuit 212 transmits the low AND signal S3 to the set terminal of the second flip-flop 210 to hold the output state of the second flip-flop 210.

As shown in FIG. 5, the error signal ES1 is higher than the reference voltage signal VPFM and lower than the reference voltage signal VPWM at time t1–t2. Therefore, the PWM comparison signal S1 is still low and the PFM comparison signal S2 descends to a low state from a high state. Because the PWM comparison signal S1 and the PFM comparison signal S2 are low, the reset signal S4 is still high. At this time, the load current signal CS is still lower than the reference current CLS, so the second flip-flop 210 still maintains the same output state.

As shown in FIG. 5, the error signal ES1 is higher than the reference voltage signal VPFM and the reference voltage signal VPWM at time t2–t3. Therefore, the PWM comparison signal S1 is increased to a high state from a low state and the PFM comparison signal S2 is still low. Because the PWM comparison signal S1 is high, the reset signal S4 descends to a low state from a high state. At this time, the load current signal CS is higher than the reference current CLS, so the current comparison signal ICS is high, and the AND circuit 212 transmits the high AND signal S3 to the set terminal of the second flip-flop 210 for transforming the state of the second flip-flop 210 to output a high selection signal, which is the PWM-enable signal PWMEN.

As shown in FIG. 5, the error signal ES1 is lower than the reference voltage signal VPWM and higher than the reference voltage signal VPFM at time t4–t5. Therefore, the PWM comparison signal S1 descends to a low state from a high state and the PFM comparison signal S2 is still low. Moreover, the reset signal S4 is still low. The load current signal CS is lower than the reference current CLS, so the current comparison signal ICS is low, and the second flip-flop 210 still outputs a high selection signal, which is the PWM-enable signal PWMEN.

As shown in FIG. 5, the error signal ES1 is lower than the reference voltage signal VPFM and the reference voltage signal VPWM at time t5–t6. Therefore, the PWM comparison signal S1 is still low and the PFM comparison signal S2 is increased to a high state from a low state. The PFM comparison signal S2 is transmitted to the set terminal of the first flip-flop 208, so the reset signal S4 is high. At this time, the load current signal CS is lower than the reference current CLS, so the current comparison signal ICS is low, and the second flip-flop 210 outputs the PFM-enable signal PFMEN.

As shown in FIG. 5, after time t7, the load current signal CS is higher than the reference current CLS, so the current comparison signal ICS is high. Moreover, at time t7, the AND circuit 212 transmits the high AND signal S3 to the set terminal of the second flip-flop 210 for transforming the state of the second flip-flop 210 to output the PWM-enable signal PWMEN.

Therefore, the present invention uses the PWM comparator and the PFM comparator to connect to a reference voltage generator, the starter and the PWM controller for receiving a reference voltage signal, the starting-enabling signal and the feedback signal respectively so as to output a PWM comparison signal and a PFM comparison signal. A first flip-flop is connected to the PWM comparator and the PFM comparator for receiving the PWM comparison signal and a PFM comparison signal, and outputting a reset signal. Moreover, a second flip-flop is connected to the first flip-flop and an AND circuit for receiving the reset signal and an AND signal, and outputting the selection signal to enable the PWM controller and the PFM controller.

Therefore, the present invention can auto-switch to either a PWM or a PFM module to enhance the efficiency of the electronic product in response to variation of the load.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

I claim:

1. An auto-switching converter with PWM and PFM selection, connected to a load through a power switch unit for supplying DC power to the load by controlling a switching action of the power switch unit, comprising:

a starter outputting a starting-enabling signal;

an auto PWM/PFM controller connected to the starter for receiving the starting-enabling signal and outputting a selection signal;

a PWM controller connected to the auto PWM/PFM controller, the power switch unit and the load for receiving a feedback voltage signal, a load current signal and the selection signal, outputting an error signal to the auto PWM/PFM controller, and outputting a PWM control signal to the power switch unit for controlling the switching action of the power switch unit; and a PFM controller connected to the auto PWM/PFM controller, the power switch unit and the load for receiving the feedback voltage signal, the load current signal and the selection signal, outputting a current comparison signal to the auto PWM/PFM controller, and outputting a PFM control signal to the power switch unit for controlling the switching action of the power switch unit;

wherein, the auto PWM/PFM controller comprises:

a reference voltage generator outputting a reference voltage signal;

a PWM comparator connected to the reference voltage generator, the starter and the PWM controller for receiving the reference voltage signal, the starting-enabling signal and the error signal, and outputting a PWM comparison signal;

a PFM comparator connected to the reference voltage generator, the starter and the PWM controller for receiving the reference voltage signal, the starting-enabling signal and the error signal, and outputting a PFM comparison signal;

a first flip-flop connected to the PWM comparator and the PFM comparator for outputting a reset signal;

an AND circuit outputting an AND signal; and a second flip-flop connected to the first flip-flop and the AND circuit for receiving the reset signal and the AND signal, and outputting the selection signal.

2. The auto-switching converter of claim 1, wherein the error signal is produced by comparing the feedback voltage signal with a reference voltage.

3. The auto-switching converter of claim 1, wherein the current comparison signal is produced by comparing the load current signal with a reference current.

4. The auto-switching converter of claim 1, wherein the second flip-flop is a R-S flip-flop.

5. The auto-switching converter of claim 1, wherein the AND circuit is connected to the PFM controller and the second flip-flop for receiving the current comparison signal and the selection signal, and outputting the AND signal by an AND-operation.

6. The auto-switching converter of claim 1, wherein the first flip-flop is an R-S flip-flop.

7. An auto PWM/PFM controller receiving a feedback signal from a PWM controller and a PFM controller, and outputting a selection signal to the PWM controller and the PFM controller to select one controller for operating by a starter, the auto PWM/PFM controller comprising:

a reference voltage generator for outputting outputs a reference voltage signal;

a PWM comparator connected to the reference voltage generator, the starter and the PWM controller for receiving the reference voltage signal, the starting-enabling signal and the error signal, and outputting a PWM comparison signal;

a PFM comparator connected to the reference voltage generator, the starter and the PWM controller for receiving the reference voltage signal, the starting-enabling signal and the error signal, and outputting a PFM comparison signal;

a first flip-flop connected to the PWM comparator and the PFM comparator for outputting a reset signal;

an AND circuit outputs an AND signal; and a second flip-flop connected to the first flip-flop and the AND circuit for receiving the reset signal and the AND signal, and outputting the selection signal.

8. The controller of claim 7, wherein the second flip-flop is an R-S flip-flop.

9. The controller of claim 7, wherein the AND circuit is connected to the PFM controller and the second flip-flop for receiving the feedback signal and the selection signal, and outputting the AND signal by AND-operation.

10. The controller of claim 7, wherein the first flip-flop is an R-S flip-flop.

* * * * *